(12) United States Patent
Shannon et al.

(10) Patent No.: US 6,806,081 B2
(45) Date of Patent: Oct. 19, 2004

(54) METHODS AND ORGANISMS FOR CONCENTRATING AND RECOVERING METALS AND MINERALS FROM AQUEOUS MEDIA

(76) Inventors: John Shannon, 216 S. Maple St., Hohenwald, TN (US) 38462; John R. Huffman, 215 Tanglewood Way, Collierville, TN (US) 38017

( * ) Notice: Subject to any disclaimer, the term of this patent is extended or adjusted under 35 U.S.C. 154(b) by 26 days.

(21) Appl. No.: 09/811,509

(22) Filed: Mar. 20, 2001

(65) Prior Publication Data

US 2001/0011376 A1 Aug. 2, 2001

Related U.S. Application Data

(63) Continuation of application No. 09/167,481, filed on Oct. 8, 1998.

(51) Int. Cl.[7] .............................. C12N 1/00; C12N 1/12; C12N 5/00
(52) U.S. Cl. ...................... 435/325; 435/243; 435/252.1
(58) Field of Search ................................ 435/325, 243, 435/252.1

(56) References Cited

PUBLICATIONS

Wilkinson et al., 1981, Microb. Ecol., vol. 7, p. 13–21.*
Wilkinson, C. R., 1980, Endocytobiology, Endosymbiosis and Cell Biology. "Cyanobacteria Symbiotic in Marine Sponges", Edited by Schwemmler et al., Walter de Gruyter & Co, Berlin, p. 553–563.*
Latyshev et al., 1992, Comp. Biochem. Physiol., vol. 102B, No. 4, pp. 961–965.*
Faulkner et al., 2000, Drugs from the sea, Basel, Karger, pp. 107–119.*
Hsu et al., 1997, 97th General meeting, Miami Beach, Florida, May 4–8, p. 504.*
Preston et al., "A psychrophilic crenarchaeon inhabits a marine sponge: Cenarchaeum symbiosum gen. Nov., sp. Nov.", Proc. Natl. Acad. Sci. USA, vol. 93, pp. 6241–6246, Jun. 1996.
Hansen et al., "Accumulation of Copper, Zinc, Cadmium and Chromium by the Marine Sponge Halichondria panicea Pallas and the Implications for Biomonitoring", Marine Pollution Bulletin, vol. 31, Nos. 1–3, pp. 133–138, 1995, entire document, especially p. 133.
Malekzadeh et al., "Accumulation of Heavy Metals by a Bacterium Isolated From Electroplating Effluent", 1996 Risk Assessment Research Symposium, pp. 1–8.
Toonen, "A Reefkeeper's Guide to Introductory Invertebrate Zoology", Part 1:Sponges, 5 pp.
Brooks, Noble Metals and Biological Systems, Chap. 6: The Noble Metal Biogeochemistry of microorganisms.
"Mineral Riches of the Sea", The South African Mining and Engineering Journal, p. 801, Aug. 31, 1940.

"Famous Gold From Sea Water Swindle", Skillings' Mining Review, vol. 25, No. 6, p. 11, Jun. 6, 1936.
"Gold From Sea–Water: Pacific Experiment", Mining Jour. (London), vol. 193, No. 5260, p. 566, Jun. 13, 1936.
"Japanese Gold From Sea–Water", Canadian Mining Journal, vol. 59, No. 10, p. 569, Oct. 1938.
"Gold From Sea–Water Again", Metals and Nonmetals Division, Mining Jour. (London), vol. 202, No. 5372, Aug. 6, 1938.
"Gold From Sea–Water Again", Common Metals Division Files, Skillings Mining Review, vol. 22, No. 52, Apr. 28, 1934.
"First Gold From Sea Water Shown To New York Chemists", Washington Star, Oct. 6, 1934.
Rosenbaum et al., "Gold In Sea Water—Fact or Fancy", Society of Mining Engineers of Aime, Preprint No. 69–AS–82, pp. 1–9.
Lucas, "Gold", Bureau of Mines, Preparing From Bulletin 675, US Department of Interior, 1985 Edition, pp. 1–16.
Watterson, "Preliminary Evidence for the Involvement of Budding Bacteria in the origin of Alaskan Placer Gold", Geology, vol. 20, No. 4, pp. 315–318.
Rennie, "Bug in a Gilded Cage", Scientific American, pp. 27–30, Sep. 1992.
Bartsch–Winkler et al., "The U.S. Geological Survey in Alaska: Accomplishments During 1983", USGS Circ. 945, pp. 1–5, 1985.
R. Brooks et al., "Noble Metals and Biological Systems: Their Role in Medicine, Mineral Exploration, and the Environment", CRC Press, pp. 159 and 168–173 (1992).
"Can–Flowers Cleanse the Earth?", Business Week, Feb. 19, 1996.
Watterson, "Artifacts Resembling Budding Bacteria Produced in a Placer–Gold Amalgams By Nitric Acid Leaching", Geology, vol. 22, pp. 1144–1146, Dec. 1994.
Watterson et al., "A Pyrolysis–Gas Chromatographic Study of Organic Matter From Snake Rive Flake–Type Placer Gold Particles", U.S. Dept. of the Interior, U.S. Geological Survey, pp. 1–28, 1995.

(List continued on next page.)

Primary Examiner—Shin-Lin Chen
(74) Attorney, Agent, or Firm—Piper Rudnick LLP; Steven B. Kelber

(57) ABSTRACT

The present invention relates to methods and organisms for concentrating and recovering metals and minerals from aqueous media. In the inventive method, a eucaryotic aquatic organism capable of concentrating a metal or mineral is contacted an aqueous medium containing the metal or mineral, in order to concentrate the metal or mineral in the organism. Following concentration, the metal or mineral accumulated by the organism may be recovered. Sponges are very preferable organisms for isolating metals, e.g, gold and silver, from seawater.

2 Claims, No Drawings

PUBLICATIONS

Rugh et al., Mercuric Ion Reduction and Resistance in Transgenic *Arabidopis Thaliana* Plants Expressing a Modified Bacterial *merA* Gene, Proceedings of the National Academy of Sciences, vol. 93, No. 8, pp. 3182–3187, Jul. 13, 1997. (Abstract).

Henaham, "New Toxic Munching Plant", Apr. 22, 1996.

Stevely et al., "The Biology and Utilization of Florida's Commercial Sponges", Technical Paper No. 8, pp. 1–45, Oct. 1978.

Stevely et al., "Survival and Growth of Cut Hooked Commercial Sponges in the Florida Keys", Florida Sea Grant College, Technical Paper No. 38, pp. 1–12, Sep. 1985.

Preston et al., "A Psychrophilic Crenarchaeon Inhabits a Marine Sponge" *Cenarchaeum Symbiosum*, Gen. No., Sp. Nov., Proceedings of the National Academy of Sciences, vol. 93, No. 13, pp. 6241–6246 (Abstract).

Search Results, Subject: Re: Aphanocapsa, From Jvacelet@com.univ–mrs.fr, Fri Aug. 2 08:59: 10 1996.

Search Results, Subject: Aphanocapsa, From Szea@santamarta.cetcol.net.co Thur Aug. 1 21:15 32 1996.

L. Jahnke, "Evolution of Bacterial Symbiosis at Deep–Sea Methane Vents", NASA Ames Space Science Division 2 pp. 1–2.

Clayton et al., Mercuric Ion Reduction and Resistance in Transgenic Arabidopis Thaliana Plants Expressing A Modified Bacterial merA Gene, Proc. Natl. Acad. Sci. USA, 93(8):3182–3187 (1997) (Abstract).

Associate Professor of Biology Autotrophic Symbiosis, Strawberry Fields: A hydrothermal–Vent Tubeworm on Top of A Sulfide Chimney at 2,200 M Depth on the Juan de Fuca Ridge.

Karin et al., Genbank Database Document Reader Accession No. K02204 M64045.

Freymond et al., Genbank Database Document Reader Accession No. U13979.

Lazarevic et al., Genbank Database Document Reader Accession No. U13832.

"A Rush on Bugs", Discover, Sep. 1992.

McNutty, "Gold From The Sea", Copyright 1994.

List of Patents on the Recovery of Gold From Sea Water, Data File, 2 pp.

Lucas, "Gold", pp. 1–12.

Reith, F., "Evidence For a Microbially Mediated Biogeochemical Cycle of Gold—A Literature Review", Advances in Regolith, pp. 336–341 (2003).

Brooks, et al., "The Noble Metal Biogeochemistry of Microorganisms", Noble Metals and Biological Systems, their Role In Medicine, Mineral Exploration, and the Environment, Robert R. Brooks, Ed., CRC Press pp. 159, 168, 169, (1992).

Carpenter, E.J., "Marine Cyanobacterial Symbioses", Biology and Environment: Proceedings of the Royal Irish Academy, 102(1):15–18 (2002).

Gardea–Torresdey, et al., "Ability of Immobilized Cyanobacteria to Remove Metal Ions From Solution and Demonstration of the Presence of Metallothionein Genes in Various Strains", Journal of Hazardous Substance Research, vol. 1, pp. 2–1to 2–18 (1998).

Unson, et al., A Brominated Secondary Metabolite Synthesized by the Cyanobacterial Symbiont of a Marine Sponge and Accumulation of the Crystallin Metabolite in the Sponge Tissue, Marine Biology 119:1–11 (1994).

Liu, et al., "Metallothionein and Cpx–ATPase Handle Heavy–Metal Tolerance in the Filamentous Cyanobacterium Oscillatoria brevis", Elsevier Science B.V., 1 page (2003).

Burja, et al., "Microbial Symbionts of Great Barrier Reef Sponges", Memoirs of the Queensland Museum 44:63–75 (1999).

Malekzadeh, et al., "Accumulation of Heavy Metals By a Bacterium Isolated From Electroplating Effluent", proceeding of the Biotechnology Risk Assessment Symposium, Canada, pp. 388–398 (1996).

Kelecom, A., "Secondary Metabolites From Marine Microorganisms", An. Acad. Bras. Cienc., 74(1):151–170 (2002).

Jayatilake, et al., "Metabolites From An Antarctic Sponge–Associates Bacterium, *Pseudomonas aeruginosa*", J. Nat. Proc. 59:293–296 (1996).

Highan, et al., "Cadmium–Binding Proteins in *Pseudomonas putida*: Pseudothioneins", Environmental Health Perspectives 65:5–11 (1986).

Langley, et al., "Effect of O–Side–Chain–Lipopolysaccharide Chemistry on Metal Binding", AEM, 65(2):489 (1998).

\* cited by examiner

METHODS AND ORGANISMS FOR CONCENTRATING AND RECOVERING METALS AND MINERALS FROM AQUEOUS MEDIA

This is a continuation of application No. 09/167,481, filed Oct. 8, 1998.

BACKGROUND OF THE INVENTION

1. Field of the Invention

The present invention relates to methods and organisms for concentrating and recovering metals and minerals from aqueous media.

2. Discussion of the Background

It is well-recognized that the oceans, lakes, and streams of the world contain significant quantities of metals, including rare, precious and strategic metals, e.g., gold. However, methods of economically extracting such metals are lacking.

The recovery of common minerals that are dissolved in seawater has been conducted for several centuries. It is economically feasible to extract materials contained at sufficiently high concentrations in seawater, such as salt, manganese and bromine. However, the more valuable minerals, e.g., gold, silver and platinum, exist in such small concentrations that extraction by current commercial means is more costly than can be justified by the value of the recovered metals.

In the last hundred years, many efforts have been made to develop efficient means of recovering these valuable metals from aqueous media. Such efforts have included chemical precipitation, resin gel filtration, etc. Many of these techniques were technically successful, but all were economically impractical since the cost of reagents, equipment, and energy exceeded the value of the recovered materials.

To be economically viable, the equipment for recovering metals and minerals from aqueous media must be extremely cheap to produce and maintain, and must be capable of processing relatively large volumes of water at a very low cost.

SUMMARY OF THE INVENTION

The present invention is directed to methods of economically extracting metals and minerals from an aqueous environment using aquatic organisms which are capable of removing metals and/or minerals from water and storing them in their tissues, i.e., concentrating metals and/or minerals, and then recovering the metals and/or minerals from the organisms.

Accordingly, it is an object of the present invention to provide methods of concentrating metals and minerals from aqueous media. It is another object of the present invention to provide aquatic organisms which are capable of concentrating metals and minerals from an aqueous medium.

The objects of the invention may be accomplished with a method of recovering metals and minerals from aqueous media by contacting an aqueous medium comprising at least one metal or mineral with a eucaryotic aquatic organism capable of concentrating the metal or mineral, to concentrate the metal or mineral in the organism; and then recovering the concentrated metal or mineral from the organism.

The objects of the invention may also be accomplished with a transgenic eucaryotic aquatic organism which is capable of concentrating at least one metal or mineral from an aqueous medium and expresses at least one heterologous gene which encodes a protein that effects the concentration of the metal or mineral in the organism.

The objects of the invention may also be accomplished with a transgenic eucaryotic aquatic organism which is capable of concentrating at least one metal or mineral from an aqueous medium, expresses at least one heterologous gene which encodes a protein that effects the concentration of the metal or mineral in the organism, and harbors a microorganism that is capable of concentrating the metal or mineral from an aqueous medium.

A more complete appreciation of the invention and many of the attendant advantages thereof will be readily obtained as the same becomes better understood by reference to the following detailed description.

DETAILED DESCRIPTION OF THE INVENTION

A wide variety of aquatic organisms may be used in the present invention. As used herein, the term "aquatic organism" refers to an organism which is capable of living in an aqueous environment, such as an ocean, a bay, a lake, a river, wastewater, etc. Preferably, the aquatic organism is an invertebrate species. Examples of suitable invertebrates include, for example, sponges, mollusks, tube worms, marine annelids, and polyps.

Sponges are particularly preferred since this organism has the ability to process relatively large volumes of water per unit mass. Sponges can filter water at a rate of ten times their own volume per minute. The regenerative properties of sponges are also attractive. Sponges can regenerate completely from very small pieces of the original organism. In addition, the feeding and respiration mechanisms of sponges make them particularly suited for the present invention in terms of economics. Sponges draw in not only the water, but also particulate matter which is used as food. It should be noted that the ingestion of microorganisms and organic matter by the sponges is particularly important for collecting metals, since a large percentage of metals in water will be associated with the surfaces of the ingested matter. The in-current openings of sponges are actively cleared of any obstructions in the normal course of their functioning, making the sponge a self-cleaning "filter". As the sponges would also tend to reproduce and create new sponges, sterile sponges are preferred. The techniques for accomplishing this have been developed and documented.

The eucaryotic aquatic organism, e.g., an invertebrate, especially a sponge, may harbor a procaryotic organism (microorganism) which is capable of concentrating metals or minerals from aqueous media. This is a major advantage of the present invention in that the microorganisms do not have to be bound or attached to a substrate or matrix in order to control their location. The procaryotic microorganism may be a bacteria, an algae, or a fungus. Bacteria are preferred.

In a preferred embodiment, the eucaryotic aquatic organism is a transgenic species which expresses at least one heterologous gene that encodes a protein which effects concentration of the metal or mineral in the organism.

Genes that encode proteins which effect bioaccumulation of metals and minerals have been identified, isolated, and inserted into other organisms. These transgenic organisms have expressed the genetic material and become active bioaccumulators of the target metals. For example, the merA gene from soil bacteria is known. This gene has been modified (merApe 9) and introduced into Arabidopsis plants (see Clayton et al, Proc. Natl. Acad. Sci., 93, pp.3182–3187, incorporated herein by reference). These genes are also capable of accumulating trivalent gold ions. In addition, biochemical pathways that isolate gold are found in several existing plants. These pathways isolate dissolved gold and concentrate it in the plants tissues. An example of a plant that does this is the Yugoslavian Horsetail (Gmelin, L., Handbach der Anorgonische Chemie, Vol. 62, pt. 2, 1954). These biochemical pathways are ideally suited for a marine environment where the concentration of gold in the surrounding environment is continually replenished.

The extraction and concentration of metals by organisms (bio-accumulation) is well known, and has received attention by researchers as a means of cleaning up sites contaminated by heavy metals. Many bacterial have an affinity for these metal ions as part of their biochemical cycles. The bio-accumulation of gold by Pedomicrobium was described by Watterson in 1991 (see Geology, 20, pp. 315–318, 1991, incorporated herein by reference). Since then, several researchers have reported microbial bio-accumulation of precious metals. These reports strongly suggest that the transgenic sponge of the present invention can be prepared.

Many marine organisms have symbiotic microorganisms (prokaryotes) of both intracellular and extracellular orientation. The total mass of these organisms can equal up to 50% of the host's total weight. Some of the symbionts, Cyanobacter for example, are of the same genus as identified metal bio-accumulators. Organisms containing symbionts are most sponges, the methane mussel of the Gulf of Mexico, giant tubeworms of the thermal vents, deep sea clams, and most marine invertebrates to some degree. These symbiotic microorganisms can be genetically engineered to bio-accumulate, i.e., concentrate, the desired metal from an aqueous solution.

In a preferred embodiment, the present invention provides for modifying the symbiotic matrix bacteria indigenous to many sponge species. These bacteria compose up to 40% of the total mass of some species. In this scenario the sponge will provide structural support and generate water flow while the bacteria function as active sites for the desired biochemical processes. These bacteria are passed on from generation to generation in the sponges and are not acquired from the surrounding environment. In this context, the bacteria cells behave as sponge cells. For a discussion of symbiotic microorganisms in sponges, see Preston et al, Proc. Natl. Acad. Sci., 93, pp. 6241–6246, incorporated herein by reference).

Recent developments in phytoremediation demonstrate that such metal-concentrating bacteria can be prepared. A bacterial gene has been added to a relative of the mustard plant to create a transgenic plant that takes up mercury from the soil (Clayton et al, supra). This plant also transforms the mercury into a less harmful form. Work is under way to create transgenic plants that target other metals.

The cell wall precious metal binding sites of some bacteria have been identified as teichoic and teichuronic acids (see, for example, Freymond et al, GenBank Accession U13979 and Lazarevic et al, Mol. Microbiol., 16(2), 345–355(1995), both incorporated herein by reference). These are not specific compounds, but rather a class. Each species of microorganism has a structure to these compounds, that is specific to that species. *Bacillus subtilis*, a microbe identified as bioactive for osmium, has already had the gene responsible for one of its teichoic acids sequenced (see Lazarevic et al cited above).

The following list identifies specific bacteria and the metals they are capable of concentrating:

*Bacillus cereus* (nucleation of gold crystals)
*Citrobacter intermedius* (silver bio-accumulator)
*Acetobacter methanolicus* (silver bio-accumulator)
*Thermothrix thiopara* (gold and silver bio-accumulator) (thermophilic cyanobacteria)
Phormidium (gold and silver bio-accumulator)
Oscillatoria (gold and silver bio-accumulator)
Mastigocladus (gold and silver bio-accumulator)
*Thiobacillus ferrooxidan* (silver bio-accumulator)
*Thiobacillus thiooxidans* (silver bio-accumulator)
*Bacillus lichenformis* (gold bio-accumulator)
Bacillus BKPM 4368 (bio-accumulation of colloidal and trivalent gold)
Pedomicrobium (gold and silver bio-accumulator)
*Bacillus subtilis* (osmium bio-accumulator).

The gene(s) responsible for accumulating the metals identified above can be isolated using well-known molecular cloning techniques and inserted into the desired host microorganism. Such routine cloning techniques are described in, for example, Perbal, A Practical Guide to Molecular Cloning, Second Edition, John Wiley & Sons, 1988 and Current Protocols in Molecular Biology, Volumes 1–3, Ausbel et al, Eds., John Wiley & Sons, 1994–1998, both of which are incorporated herein by reference in their entirety.

The growth and cultivation of sponges are well-known. For a discussion of sponge biology, growth and cultivation see, for example, Bergquist, Sponges, University of California Press, 1978; Stevely et al, The Biology and Utilization of Florida's Commercial Sponges, Technical Paper No. 8, Technical Paper of the State University System of Florida Sea Grant College Program, University of Florida, Gainesville, October 1978; and Stevely et at, Survival and Growth of Cut vs Hooked Commercial Sponges in the Florida Keys, Technical Paper No. 38, Florida Sea Grant Extension Program, University of Florida, Gainesville, Project No. IR-82-15, October 1978; all of which are incorporated herein by reference.

The eucaryotic aquatic organism is contacted with an aqueous medium containing at least one metal or mineral to be accumulated. The aqueous medium may be seawater, fresh water from, for example, a river or a lake. Alternatively, the aqueous medium may be wastewater from an industrial process. The aqueous medium may also contain variable quantities of organic matter. Seawater is preferred.

The target metal or mineral may be gold, silver, platinum, osmium, aluminum, scandium, titanium, vanadium, chromium, manganese, iron, cobalt, nickel, copper, zinc, gallium, germanium, arsenic, selenium, strontium, atrium, zirconium, niobium, molybdenum, ruthenium, rhodium, palladium, cadmium, indium, tin, antimony, tellurium, hafnium, tantallum, tungsten, renium, iridium, mercury, thallium, lead, bismuth, or any of the lathanides. The metal is typically in the form of the cation in the aqueous medium. The metal ion may be converted to corresponding zerovalent metal species in the organism. Gold is especially preferred for its enormous economic value.

The aqueous medium and the eucaryotic organism are contacted for a time sufficient to concentrate the metal or mineral in the organism. The contact time may be widely varied. Suitable contact times are from several hours or days to several years, e.g., 1 week to ten years.

Following concentration of the metal or mineral may be recovered from the organism. For example, the organism may be burned in order to separate the organic matter form the metal. As used herein, the recovering the metal or mineral from the organism includes recovery from the eucaryotic organism, the symbiotic procaryotic organism, or both.

EXAMPLE

The following is designed to illustrate the implementation of the present invention, and is not limiting.

2,000,000 sponges can be farmed in a square one thousand yards on a side. The sponges will take four to five years to grow to the average size used in our projections (7" diameter). Consequently, we envision planting a sponge bed (or beds) each year for five years. This would provide a steady supply of harvestable sponges after the fifth year.

The sponges will accumulate gold over their entire life but since a sponge filters water in proportion to its size, it will accumulate more than half the total gold collected during its fifth year. During the fifth year each sponge will filter just over a half million cubic feet of seawater. With two million sponges this is over one trillion cubic feet of water filtered by a sponge bed. This one trillion cubic feet of ocean water will contain over two million troy ounces of gold that the sponges will extract from the water and accumulate in their tissues. The cumulative amount of gold extracted during the five year period should be over 3.8 million troy ounces.

Obviously, numerous modifications and variations of the present invention are possible in light of the above teachings. It is therefore to be understood that within the scope of the appended claims, the invention may be practiced otherwise than as specifically described herein.

What is claimed is:

1. A method of recovering metals and minerals from sea water, comprising:

contacting a sponge that harbors bacteria capable of concentrating said metal or mineral with sea water, said sponge having a symbiotic relationship with said bacteria, so as to concentrate the metal or mineral in the bacteria; and recovering the concentrated metal or mineral from the bacteria.

2. A method of recovering metals and minerals from sea water, comprising:

contacting a sponge that harbors bacteria capable of concentrating said metal or mineral, said sponge having a symbiotic relationship with said bacteria, said bacteria being Cyanobacteria; and recovering concentrated metal or mineral from said sponge.

* * * * *